(12) United States Patent
Venier

(10) Patent No.: US 6,567,485 B1
(45) Date of Patent: May 20, 2003

(54) APPARATUS FOR COMMUNICATING BETWEEN A NEURAL NETWORK AND A USER SYSTEM VIA A BUS

(75) Inventor: Philippe Venier, Cordast (CH)

(73) Assignee: CSEM Centre Suisse d'Electronique et de Microtechnique S.A., Neuchatel (CH)

(*) Notice: Subject to any disclaimer, the term of this patent is extended or adjusted under 35 U.S.C. 154(b) by 0 days.

(21) Appl. No.: 09/318,663

(22) Filed: May 25, 1999

(30) Foreign Application Priority Data

May 25, 1998 (FR) .............................. 98 06535

(51) Int. Cl.[7] .............................................. H04L 7/00
(52) U.S. Cl. ..................................................... 375/356
(58) Field of Search ........................ 340/825.5, 825.02; 709/225; 710/108, 110; 370/462, 461; 375/356

(56) References Cited

U.S. PATENT DOCUMENTS

| | | | | |
|---|---|---|---|---|
| 4,652,873 A | * | 3/1987 | Dolsen et al. ........... | 340/825.5 |
| 4,755,990 A | | 7/1988 | Bohler et al. | |
| 5,065,153 A | | 11/1991 | Tomita et al. | |
| 5,175,731 A | * | 12/1992 | Suarez .................... | 340/825.5 |
| 5,434,984 A | * | 7/1995 | Deloddere et al. ....... | 340/825.5 |

OTHER PUBLICATIONS

A Communication Scheme for Analog VLSI Perceptive Systems, Philippe Venier et al., IEEE Journal of Solid–State Circuits, Jun. 1995, No. 6, New York, US.*

"A Communication Scheme for Analog VLSI Perceptive Systems," Alessandro Mortara, Eric A. Vittrox and Philippe Venier, IEEE Journal of Solid State Circuits, NY, vol. 30 (Jun. 1995), pp. 660–669.

"An Analog Approach to "Neuromorphic" Communication," Marienborg et al, Circuits and Systems Connecting the World, Atlanta, (May 1996) pp 397–400.

* cited by examiner

*Primary Examiner*—Stephen Chin
*Assistant Examiner*—Kevin Kim
(74) *Attorney, Agent, or Firm*—Jacobson Holman PLLC

(57) ABSTRACT

Apparatus for communication between a neural network and a user system via a bus includes an activity/frequency converter for each neurone of the network. The activity/frequency converter produces activity pulses which are encoded by encoders and then placed on the communication bus. Arbitration arrangements for each converter include an inhibition control circuit and a blocking circuit connected in common to all the converters to transmit a temporary blocking command to them. Each control circuit detects the presence of a pulse at the output of its associated converter and, while any such pulse is present, activates the blocking circuit so that it transmits the command for temporarily blocking their operation to the other converters.

6 Claims, 6 Drawing Sheets

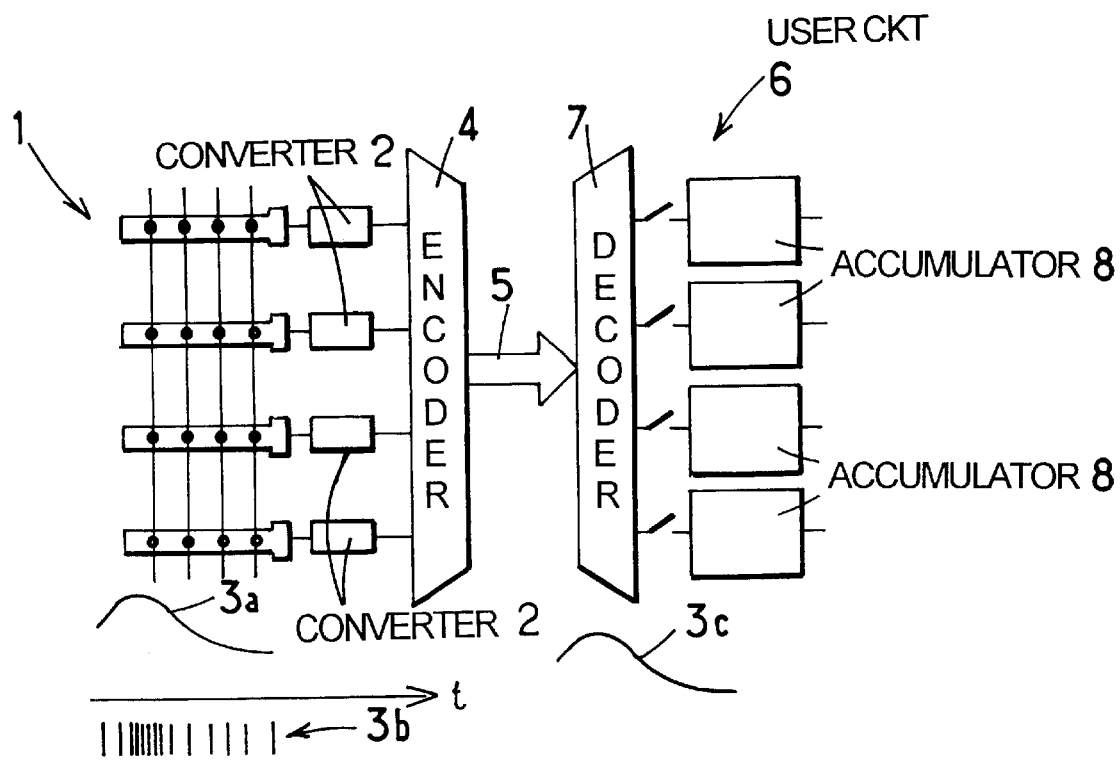
FIG.:1
PRIOR ART
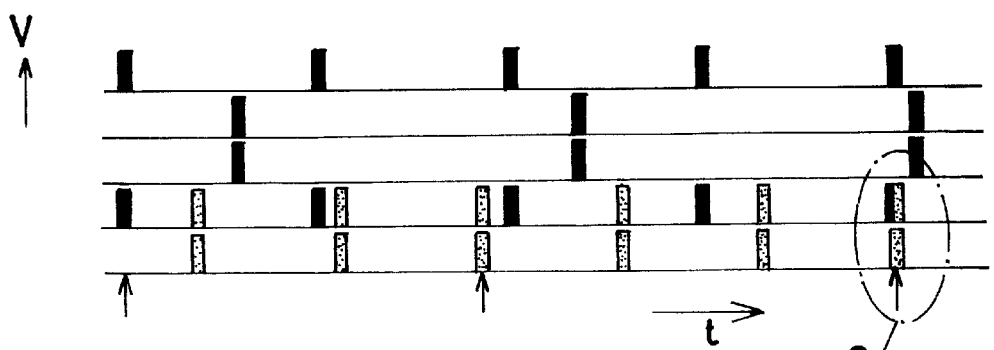
FIG.:2
PRIOR ART

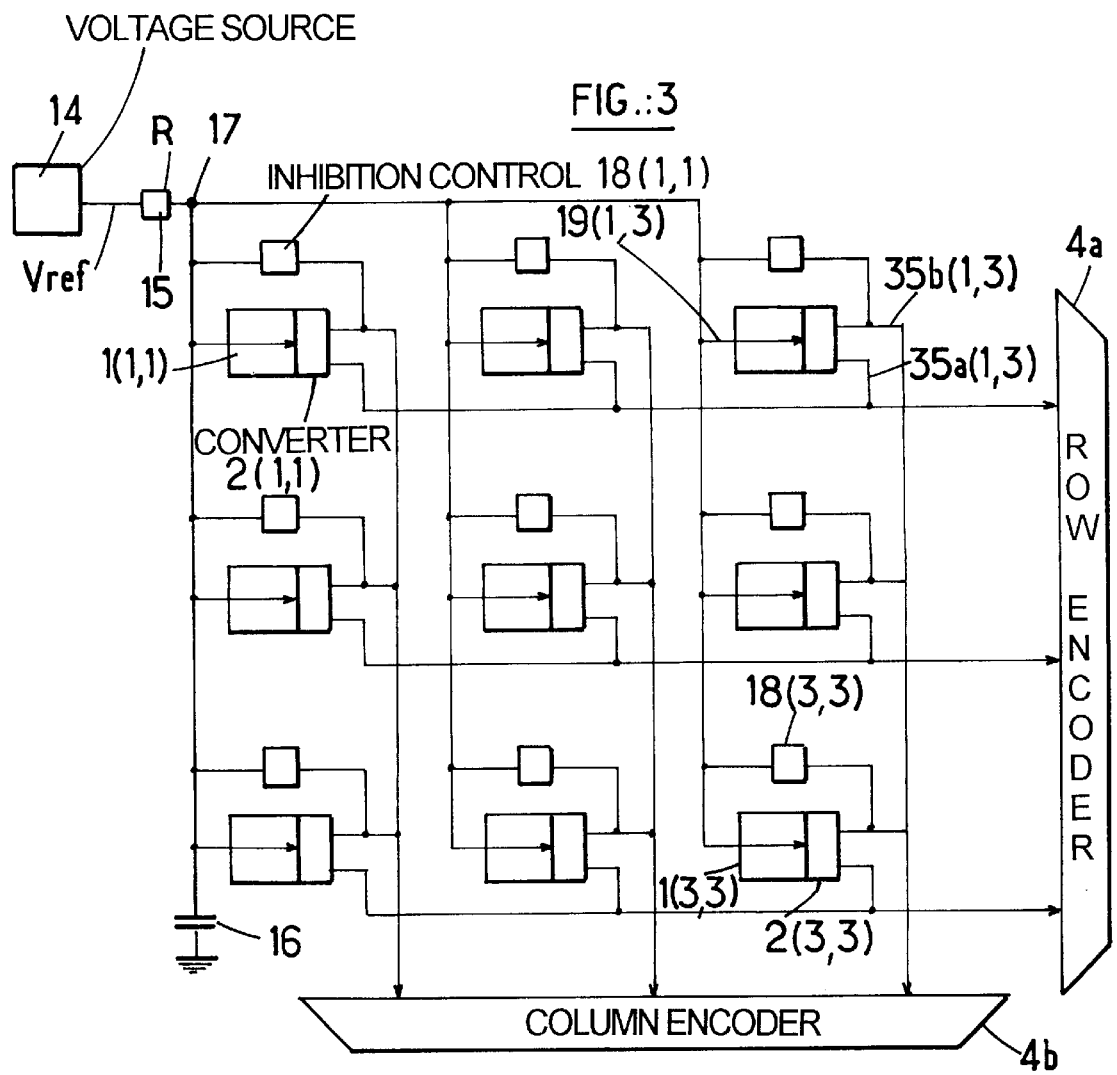
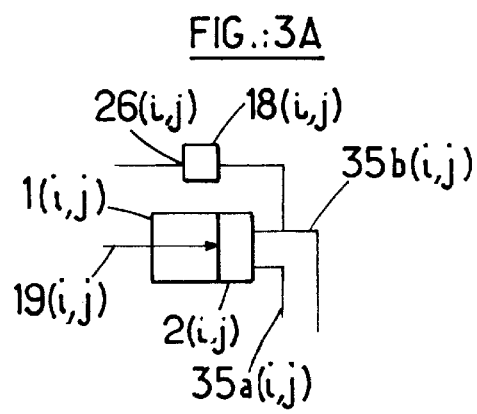

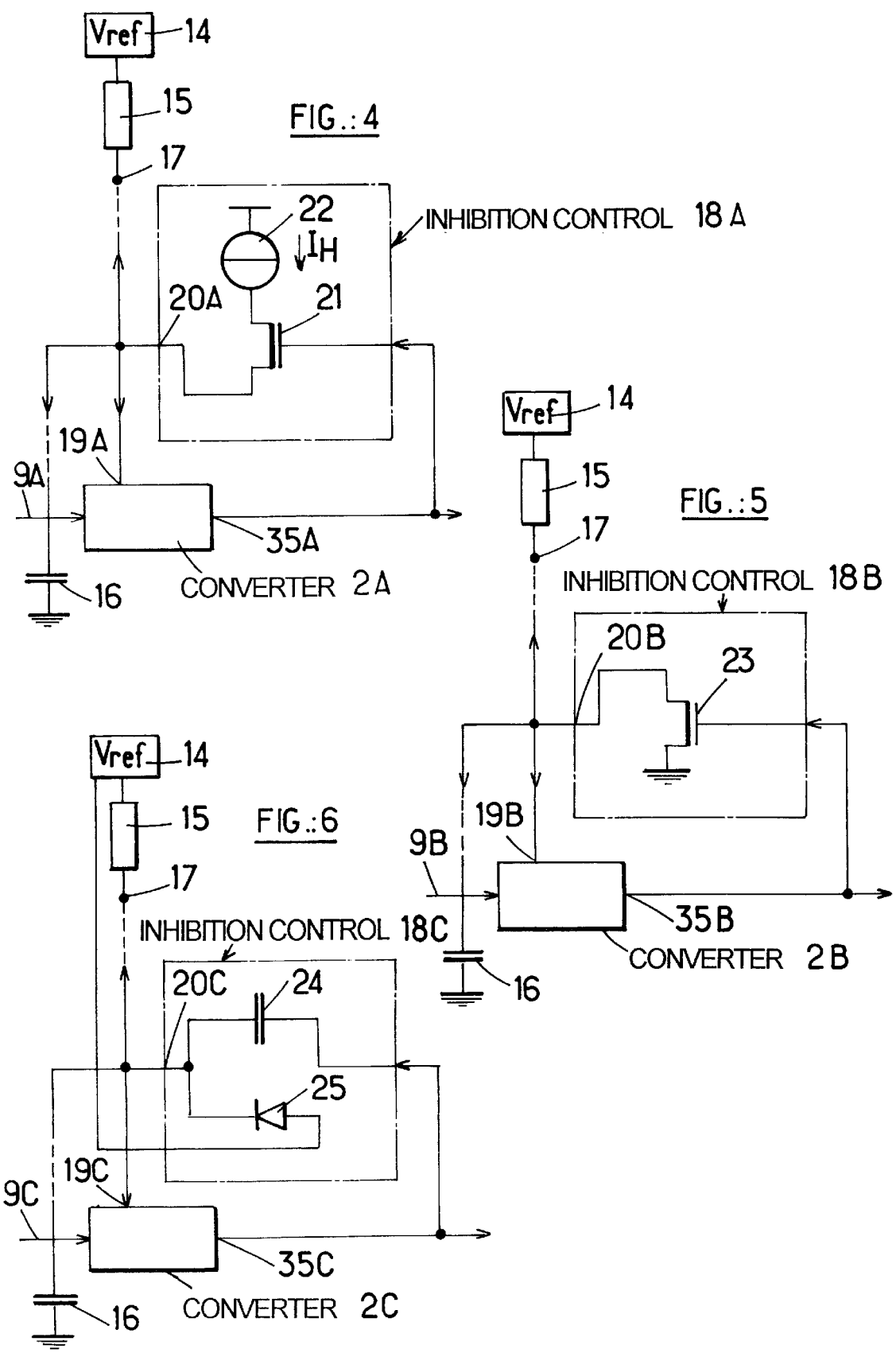

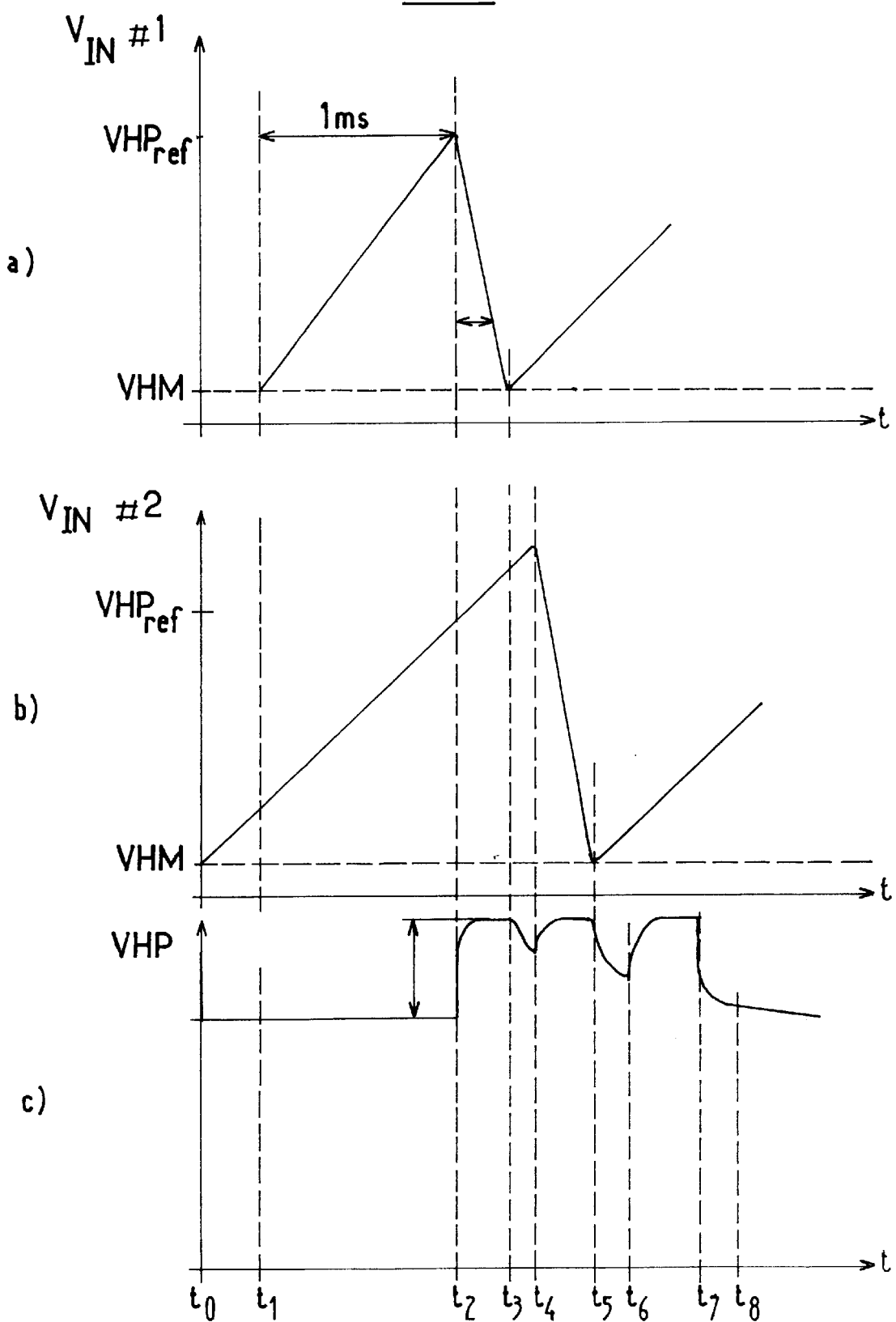

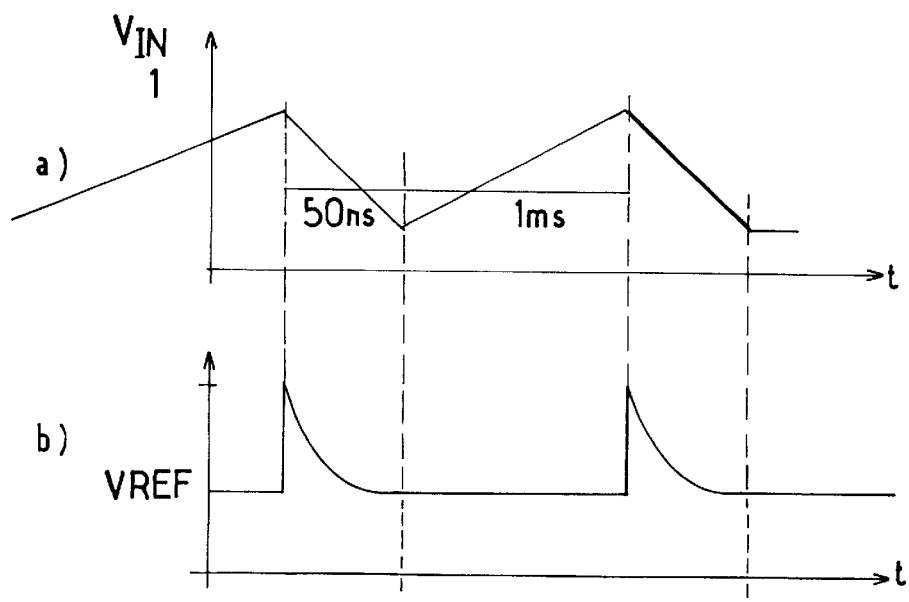
FIG.: 9
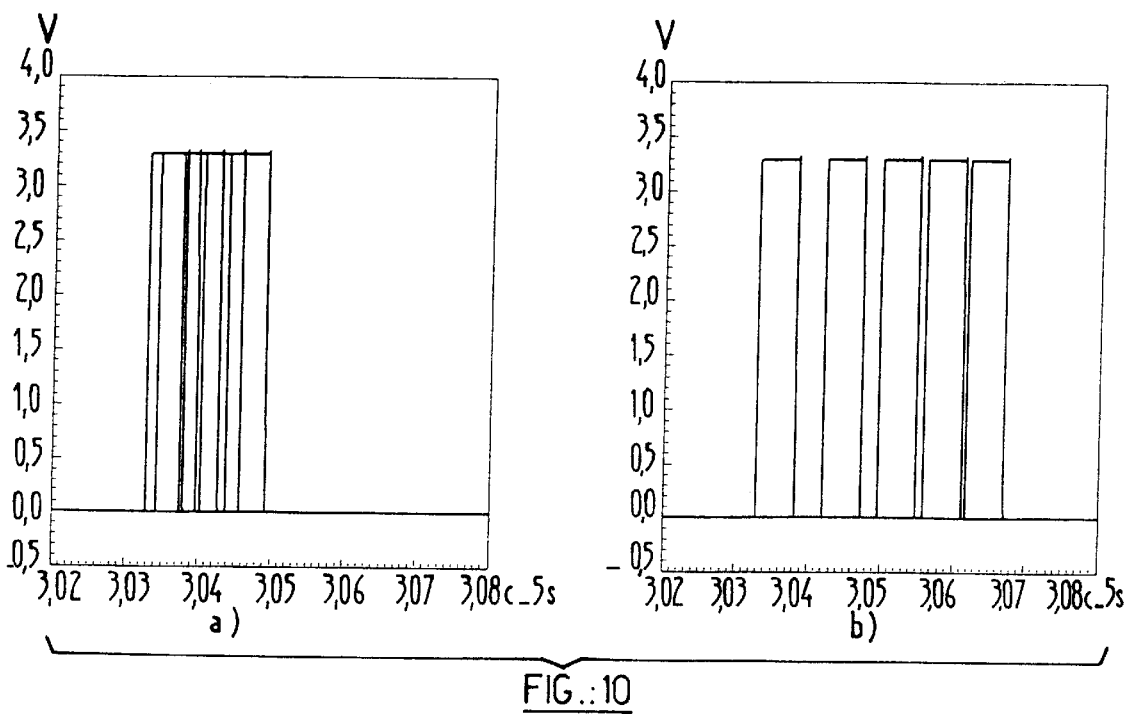
FIG.: 10

APPARATUS FOR COMMUNICATING BETWEEN A NEURAL NETWORK AND A USER SYSTEM VIA A BUS

BACKGROUND OF THE INVENTION

1. Field of the Invention

The present invention concerns apparatus for communication between a user system and a neural network of a perception system via a communication bus carrying information in the form of asynchronous pulses generated from analog signals produced by the neurones of the network.

2. Description of the Prior Art

An artificial perception system using a neural network is described in an article by Mortara et al. published in IEEE Journal of Solid State Circuits, Vol. 30, No. 6, June 1995.

FIGS. 1 and 2 of the accompanying drawings reproduce FIG. 1 of the above article.

The artificial neurones of a network 1 are associated with current/frequency converters 2 that allow for the activity of the neurones. The activity of a neurone is symbolized at 3a and can be represented by a time-varying analog magnitude (current or voltage), for example. The converter 2 converts this activity into a series of pulses 3b whose frequency is proportional to the amplitude of the analog magnitude. The outputs of the converters 2 are fed, via the encoder 4, to the communication bus 5, using a code specific to each neurone. FIG. 2 shows the activity of three neurones encoded on the five lines of the bus 5: the first and fourth wires for the first neurone (code 10010), the second and third wires for the second neurone (code 01100) and the fourth and fifth wires for the third neurone (code 00011).

The communication bus 5 terminates at a user circuit 6 at a greater or lesser distance from the network 1. This circuit includes a decoder 7 and activity accumulators 8, each accumulator restoring the activity signal of the associated neurone, as shown at 3c.

The aforementioned article therefore describes a multiplexing method which differs from the usual multiplexing method in that it does not entail scanning all the neurones cyclically. To the contrary, when a pulse generated by the activity of a neurone must be transmitted, the neurone has asynchronous direct access to the bus by sending its network address on the bus. Consequently, the average number of pulses sent by a neurone is proportional to its activity. This multiplexing method has the advantage that the most active neurones can use the greater part of the bandwidth of the bus, which makes the system respond faster.

Clearly under the above conditions, and depending on the excitation of the network (for example by light if the network is optically sensitive), two or more neurones can access the bus simultaneously. This is shown in the right-hand part of FIG. 2 in which pulses specific to neurones with respective row codes 10010 and 00011 coincide in time at a moment shown by the chain-dotted line C.

Thus, unless particular precautions are taken, if all the neurones have unrestricted access to the bus, there is an attendant risk of "collisions". Of course, careful choice of the neurone address codes prevents addressing errors, but this restricts the number of codes available and does not prevent collisions, the probability of which increases with the increasing total activity of the neurones and the width of the pulses.

From the point of view of network performance, collisions cause unwanted attenuation of the transmitted signal and uncertainty in the received signal (noise).

To avoid these problems and to improve the performance of the communication device a system is required for arbitrating access to the transmission bus.

This arbitration system can be that described in an article by J. Lazzaro et al. "Silicon auditory processors as computer peripherals", published in IEEE Transactions on Neural Networks, vol. 4 pages 523 to 528, May 1993. In this case, when a neurone wishes to send a pulse, it submits a request to the arbitration system which verifies if the communication bus is free and returns an authorization to send signal to the neurone. If two neurones wish to access the bus at the same time, the arbitration system uses an arbitration tree to choose one of the two neurones and has the other one wait. Although this can prevent collisions, it does so at the cost of significant complexity of the circuits. Request and authorization conductors must be provided for each row and each column of the array, together with an arbitration tree for the rows and the columns, which increases the complexity of the circuit. Also, the transmission speed is considerably reduced.

An aim of the invention is to provide apparatus for communication between a neural network and a user system via an information transmission bus that does not complicate the units upstream and downstream of the bus and which, through improved arbitration, achieves faster transmission for comparable quality than can be obtained with a system operating without arbitration.

SUMMARY OF THE INVENTION

The invention therefore consists in apparatus for communication via a transmission bus between a user system and a neural network made up of neurones connected in an addressable matrix, the apparatus including an activity/frequency converter for each neurone adapted to provide at its outputs pulses whose frequency represents the activity of the neurone, the outputs of the converters associated with the neurones of the matrix being connected to an encoder by which the pulses are allocated a binary code specific to the neurone that caused them to be produced and the encoder being connected to the bus for transmitting the codes to the user system, the device also including arbitration means for determining the order of succession on the transmission bus of the various codes produced by the neurones of the network, the arbitration means comprising, for each of the converters, a circuit for controlling inhibition of operation of its associated converter and blocking means connected in common to all the converters to transmit to them a temporary blocking command, each inhibition control circuit being adapted to detect the presence of a pulse at the output of its associated converter and, while any such pulse is present, to activate the blocking means so that they transmit to the other converters the command temporarily blocking their operation.

By virtue of the above features, the invention exploits for the purposes of arbitration the presence of a pulse at the output of the converter corresponding to the neurone active at the time concerned to block the operation of all the other converters, for as long as the pulse produced by that neurone lasts. This leads to a very simple circuit requiring only a minimum of simple components, although the arbitration is totally reliable.

Also, the bandwidth of the communication bus is significantly increased.

Advantageously, for maximum simplification of the means employed, the blocking means comprise a reference voltage source connected to a voltage divider having an intermediate node connected to each of the control circuits and to a blocking input of each converter, each control circuit is adapted to modify the potential of the intermediate node while a pulse is present at the output of the associated converter, the modification of the potential, by activating the blocking inputs of all the other converters, preventing the production of any pulse thereby.

According to another advantageous feature of the invention, the voltage divider comprises the series-connected combination of a resistor and a capacitor the common point of which forms the intermediate node and the series-connected circuit is connected between the reference voltage source and ground.

If, as is known per se, each converter comprises a Schmitt trigger to whose input the activity signal from the neurone connected to that converter is applied and whose output is connected to the encoder, the trigger is connected to two hysteresis voltage sources between which hysteresis voltages the activity signal must evolve to cause the trigger to change state and thereby determine the length and the spacing of the pulses, and one of the hysteresis voltage sources is the intermediate node of the voltage divider.

In a first variant of the invention, each inhibition control circuit comprises a transistor whose gate is connected to the output of the associated converter and whose source-drain path is connected between a current source and the intermediate node.

In a second variant of the invention, each inhibition control circuit comprises a transistor whose gate is connected to the output of the associated converter and whose source-drain path is connected between the intermediate node of the divider and ground.

In a third variant of the invention, each inhibition control circuit comprises a capacitor connected between the output of the converter and the intermediate node and a diode connected between the reference voltage source and the intermediate node of the divider.

Other features and advantages of the invention will become apparent during the course of the following description which is given by way of example only and with reference to the accompanying drawings.

BRIEF DESCRIPTION OF THE DRAWINGS

FIG. 1, already described, is a simplified diagram of a neural network associated with a prior art communication device for transmitting information on activity of the network to a user system via a communication bus.

FIG. 2, also already described, is a timing diagram showing the transmission of neurone activity codes from the network of FIG. 1 over a transmission bus and the risks of collision between codes that such transmission can entail.

FIG. 3 is a block diagram of a neural network using the communication apparatus of the invention.

FIG. 3A shows the connections and the associated circuits of any neurone from the FIG. 3 network.

FIGS. 4 to 6 show three highly simplified embodiments of the communication apparatus of the invention.

FIGS. 8 and 9 are graphs illustrating the embodiments from FIGS. 4 to 6, respectively.

FIG. 10 is a diagram illustrating the result that can be obtained from communication apparatus of the invention.

DETAILED DESCRIPTION OF THE PREFERRED EMBODIMENTS

Figure 7:
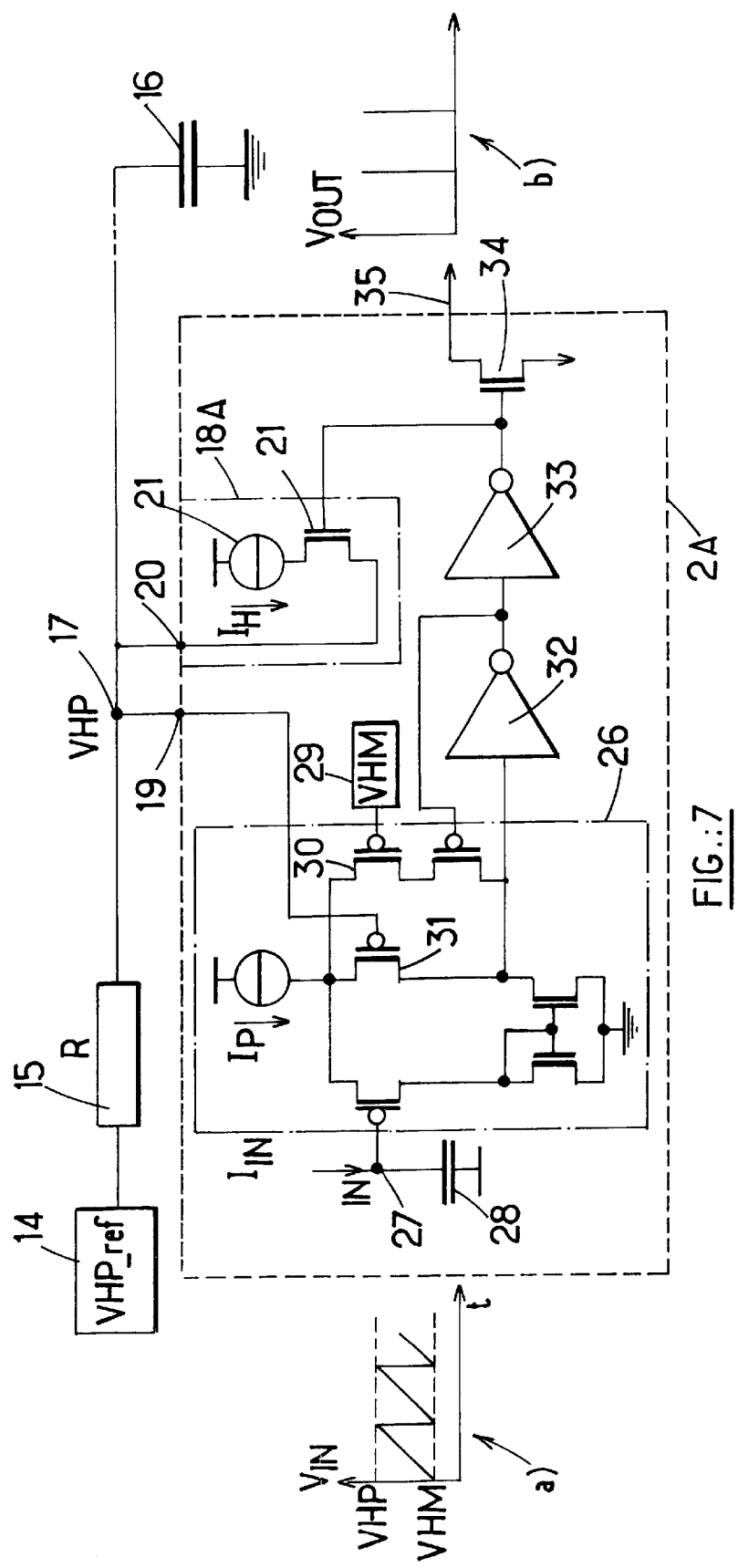
FIG. 7 shows in more detail how the FIG. 4 embodiment of the invention can be used.

Refer first to FIG. 3, which is a simplified diagram of communication apparatus of the invention.

The diagram, which is similar in principle to that from FIG. 1, corresponds to a matrix of 3×3 neurones, for example. A matrix of this kind can include a very large number of neurones, of course, all connected in the same way, any neurone in the matrix with coordinates i, j being connected in accordance with the detailed diagram in FIG. 3A.

Each neurone 1 (i, j), delivering a current proportional to its activity, is associated with a current/frequency converter 2 (i, j) whose output signal is simultaneously transmitted to a row encoder 4a and to a column encoder 4b via respective links 35a (i, j) and 35b (i, j). Each encoder is connected to a communication bus (not shown). The invention provides means for arbitrating access to the communication buses by the converters 2.

The arbitration means include blocking means connected in common to all the converters 2 (i, j) to transmit a temporary blocking command to them. The blocking means include a voltage source 14 delivering a direct current voltage $V_{ref}$. The voltage source is connected to a voltage divider comprising a resistor 15 connected to a capacitor 16 which is grounded. The capacitor 16 can be the stray capacitance between the node 17 and ground. The node 17 is connected in common to the outputs 20 (i, j) of inhibition control circuits 18 (i, j) respectively associated with each voltage/frequency converter 2 (i, j).

Each inhibition control circuit 18 (i, j) is also connected to the output of its associated converter so that it can detect the presence of a pulse there. The intermediate node 17 is also connected to respective blocking terminals 19 (i, j) of the converters 2 (i, j).

To be more precise, when a pulse appears at the output of the associated converter, because of the activity of a given neurone 1 (i, j), the inhibition control circuit 18 (i, j) activates the blocking means. This is equivalent to modifying the potential of the node 17, which then assumes a value at the blocking terminal 19 (i, j) of the voltage/frequency converters such that their operation is suspended, although the converter corresponding to the active neurone continues to be operative.

The change in the state of the potential at the node 17 is therefore perceived by all the other converters which, under these conditions, produce no further pulses at their output for as long as one of the neurones is active. The suspension of operation continues for as long as the pulse produced by the neurone which is first active lasts.

FIGS. 4 to 6 are theoretical diagrams of three different embodiments of the inhibition control circuit. In these figures, equivalent components are identified by identical reference numbers to which the respective letters A, B and C have been appended. Certain other components already shown in FIGS. 3 and 3A have also been carried over. Furthermore, for simplicity, these figures show only one converter although, of course, all the converters are associated with their own inhibition control circuit implemented as shown in FIGS. 4 to 6, respectively.

In FIG. 4, the output of the voltage/frequency converter 2A is connected to the gate of a transistor 21 of the inhibition control circuit 18A and the source-drain path of the transistor is connected between a current source 22 and the intermediate node 17. Consequently, if the transistor 21 is turned on by a pulse produced by the converter 2A (indicating that a corresponding neurone of the matrix network is active), a current $I_H$ is injected into the node 17, which modifies the potential at the blocking terminals 19A of all the converters. This potential variation can block the converters even if their associated neurones are active at the time concerned, with the exception of the one whose corresponding neurone is active.

In FIG. 5, the inhibition control circuit 18B includes a transistor 23 whose gate is connected to the output of the converter 2B and whose source-drain path is connected between ground and the node 17. In this case, the inhibition control circuit 18B applies the ground potential to the blocking terminals of all the converters. The operation of the converter whose neurone is active at the time concerned is unaffected by the status of its blocking terminal.

In FIG. 6, the inhibition control circuit 18C comprises a capacitor 24 connected between the output of the converter 2C and the node 17, which is also connected to the output of the voltage source 14 via a diode 25. In this case, the node 17 tracks the voltage to which the capacitor 24 is charged.

FIG. 7 shows one embodiment of a current/frequency converter and its associated inhibition control circuit that can be used in the FIG. 4 embodiment to implement the function of the block 2A in association with the inhibition control circuit in the FIG. 4 version.

The converter includes a Schmitt trigger 26 whose input 27 receives a voltage $V_{in}$ from a neurone of the network. That input is connected to ground via a capacitor 28 which can be the stray capacitance between the input 27 and ground. The Schmitt trigger switches between two hysteresis voltages VHP and VHM. The voltage VHM is fixed and comes from a reference source 29. It is applied to the gate of a transistor 30. The other hysteresis voltage VHP of the trigger is applied to the blocking terminal 19 of the converter, which is in fact the gate of a transistor 31.

The output of the Schmitt trigger 26 is connected to a set of two inverters 32 and 33 connected in series. The output of the second inverter 33 is connected to the transistor 21 of the inhibition control circuit 18A.

The output of the inverter 33 is also connected to the gate of a transistor 34 whose source-drain path is connected between ground and an output 35 of the converter 2A.

FIG. 7 also shows at a) one form of the input voltage $V_{IN}$ of the Schmitt trigger 26 and at b) the voltage $V_{OUT}$ at the output 35.

If a neurone corresponding to the converter 2A concerned sends an activity signal, a voltage appears at the input 27 of the Schmitt trigger 26. The input capacitor 28 integrates this voltage, which can change until it reaches the hysteresis voltage VHP. A pulse is then generated at the output 35 of the converter and the input node 27 is reinitialized to the voltage VHM.

However, the emission of a pulse at the output 35 also causes the transistor 21 of the inhibition control circuit 18A to conduct and the current source 22 can then charge the node 17 at which the voltage VHP is present. This raises this voltage and therefore the value of the hysteresis voltage of the other converters connected to the other neurones. Consequently, in order to be able to change state, the Schmitt triggers of the other converters have to receive an input voltage that from here on is greater than the initial voltage VHP that was equal to $VHP_{ref}$ (the voltage $V_{ref}$ from FIG. 3).

FIG. 8 shows graphically what has just been described. It represents at a) the voltage at the input of any converter 2 (i, j) from FIG. 3A, that converter being hereinafter designated 2A-N1 and being assumed, for the purposes of this example, to be associated with a neurone N1. FIG. 8 shows at b) the input voltage of another converter 2A-N2 whose associated neurone is denoted N2. It is also assumed that the neurones N1 and N2 are successively active and that the activity of neurone N1 is more intense than but delayed relative to that of neurone N2.

This timing diagram is not to constant scale, to facilitate showing how the voltages evolve with time. For example, the interval between times t1 and t2 can be 1 ms whereas the interval between times t2 and t3 can be only 50 ns. Generally speaking, the input voltage of a converter rises much more slowly than it falls, in proportions more or less as just indicated.

Finally, FIG. 8 shows at c) the evolution of the voltage VHP at the node 17 when the activities of the neurones N1 and N2 as defined above partially coincide in time.

Graphs a) and b) of FIG. 8 show that the activity of neurone N2 begins at a given time t0 and the input voltage $V_{IN}$ of the converter 2A-N2 begins to rise from the voltage VHM of the Schmitt trigger of that converter. At time t1, neurone N1 begins in turn to manifest activity and the input voltage of its converter 2A-N1 begins to grow from the voltage value VHM. The slope of the voltage of neurone N1 is steeper than that of the voltage of neurone N2, which means that neurone N1 is "more active" than neurone N2.

However, in the absence of the arrangements in accordance with the invention, the pulses generated by the converters 2A-N1 and 2A-N2 would at least partly overlap and there would therefore come about what is referred to hereinabove as a "collision", which would make it impossible to transmit over the bus 5 the pulses due to the quasi-simultaneous activity of the two neurones.

In the invention, this "collision" cannot occur unless two neurones begin their activity with the same intensity at the same time, which is statistically rare.

To be more precise, when the input voltage $V_{IN}$ of neurone N1 reaches the value $VHP_{ref}$ supplied by the source 14, which is present at the node 17 at this time, the Schmitt trigger 26 of the converter 2A-N1 changes state (time t2). A pulse therefore appears at the output 35 of that converter, allowing for the activity of the neurone. Secondly, transistor 21 in the inhibition control circuit 18A of the converter 2A-N1 is turned on, which causes the voltage at the node 17 to increase, this increase being common to all the converters of the neural network. Accordingly, the trigger levels of the Schmitt triggers 26 of all the converters except that of neurone N1 increase, as seen from time t2 in graph c) in FIG. 8. Consequently, no Schmitt trigger of the other converters can change state, regardless of the activity of the associated neurone. In the example shown in FIG. 8, this is the case for converter 2A-N2.

The activity of the latter continuing (the voltage $V_{IN}$ of the converter 2A-N2 continues to rise, even though the voltage VHP at the node 17 has fallen), at time t4 the input voltage reaches the current value of the voltage VHP at the node 17 and at this time the Schmitt trigger 26 of the converter 2A-N2 begins to change state. This change of state again raises the voltage VHP at the node 17, thereafter prohibiting the production of any output pulse from any of the other converters.

The voltage VHP remains at the higher level throughout the output pulse from the converter 2A-N2, after which its level again decreases, from time t5. It is further assumed that from this time another neurone is active, up until time t7, after which the neurones of the network do not show any activity, at least for the time being. Accordingly, the voltage VHP returns to the reference value $VHP_{ref}$, no inhibition block being active from time t8.

Similar operation occurs if the inhibition control circuit 18B is used in accordance with FIG. 5. In this case the form of the voltage VHP will be slightly different from that shown at c) in FIG. 8, in that its value decreases from the reference value $VHP_{ref}$ to a very much lower value, for example to zero, if a pulse is emitted by a converter.

FIG. 9 shows at a) the form of the input voltage of a converter equipped with an inhibition control circuit 18C as shown in FIG. 6. In this case, the voltage at the node 17 takes the form shown at b) in FIG. 9 in the event of activity of the neurone concerned. To highlight the form of the voltages, the time axis is again not to scale.

FIG. 10 shows the pulses produced at the same time by five neurones in a system (at a) with no arrangements in accordance with the invention and a system (at b) in which the converters are provided with one or other variants of the arbitration means as just described. Clearly, in the latter case, the pulses occur one after the other and are clearly separated in time.

There is claimed:

1. Apparatus for communication via a transmission bus between a user system and a neural network made up of neurones connected in an addressable matrix, said apparatus including an activity/frequency converter for each neurone adapted to provide at its outputs pulses whose frequency represents the activity of said neurone, the outputs of said converters associated with said neurones of said matrix being connected to an encoder by which said pulses are allocated a binary code specific to the neurone that caused them to be produced and said encoder being connected to said bus for transmitting said codes to said user system, said apparatus also including arbitration means for determining the order of succession on said transmission bus of the various codes produced by said neurones of said network, said arbitration means comprising, for each of said converters, a circuit for controlling inhibition of operation of its associated converter and blocking means connected in common to all said converters to transmit to them a temporary blocking command, each inhibition control circuit being adapted to detect the presence of a pulse at the output of its associated converter and, while any such pulse is present, to activate said blocking means so that they transmit to the other converters said command temporarily blocking their operation, wherein said blocking means includes a reference voltage source and a voltage divider connected to said reference voltage source, said voltage divider having an intermediate node connected to each inhibition control circuit and to a blocking input of each converter, each control circuit modifying the potential of said intermediate node while a pulse is present at the output of the associated converter, the modification of the potential, by activating said blocking inputs of all the other converters, preventing the production of any pulse thereby.

2. Communication apparatus as claimed in claim 1 wherein said voltage divider comprises the series-connected combination of a resistor and a capacitor the common point of which forms said intermediate node and said series-connected circuit is connected between said reference voltage source and ground.

3. Communication apparatus as claimed in claim 2 wherein each converter comprises a Schmitt trigger to whose input the activity signal from the neurone to that converter is applied and whose output is connected to said encoder, said trigger is connected to two hysteresis voltage sources between which hysteresis voltages said activity signal must evolve to cause said trigger to change state and thereby determine the length and the spacing of said pulses, and one of said hysteresis voltage sources is said intermediate node of said voltage divider.

4. Communication apparatus as claimed in claim 3 wherein each inhibition control circuit comprises a transistor whose gate is connected to said output of the associated converter and whose source-drain path is connected between a current source and said intermediate node.

5. Communication apparatus as claimed in claim 3 wherein each inhibition control circuit comprises a transistor whose gate is connected to said output of the associated converter and whose source-drain path is connected between said intermediate node of said divider and ground.

6. Communication apparatus as claimed in claim 3 wherein each inhibition control circuit comprises a capacitor connected between said output of said converter and said intermediate node and a diode connected between said reference voltage source and said intermediate node of said divider.

* * * * *